March 21, 1944.     W. A. HEINRICH     2,344,551
TRAILER
Filed March 7, 1941     2 Sheets-Sheet 1
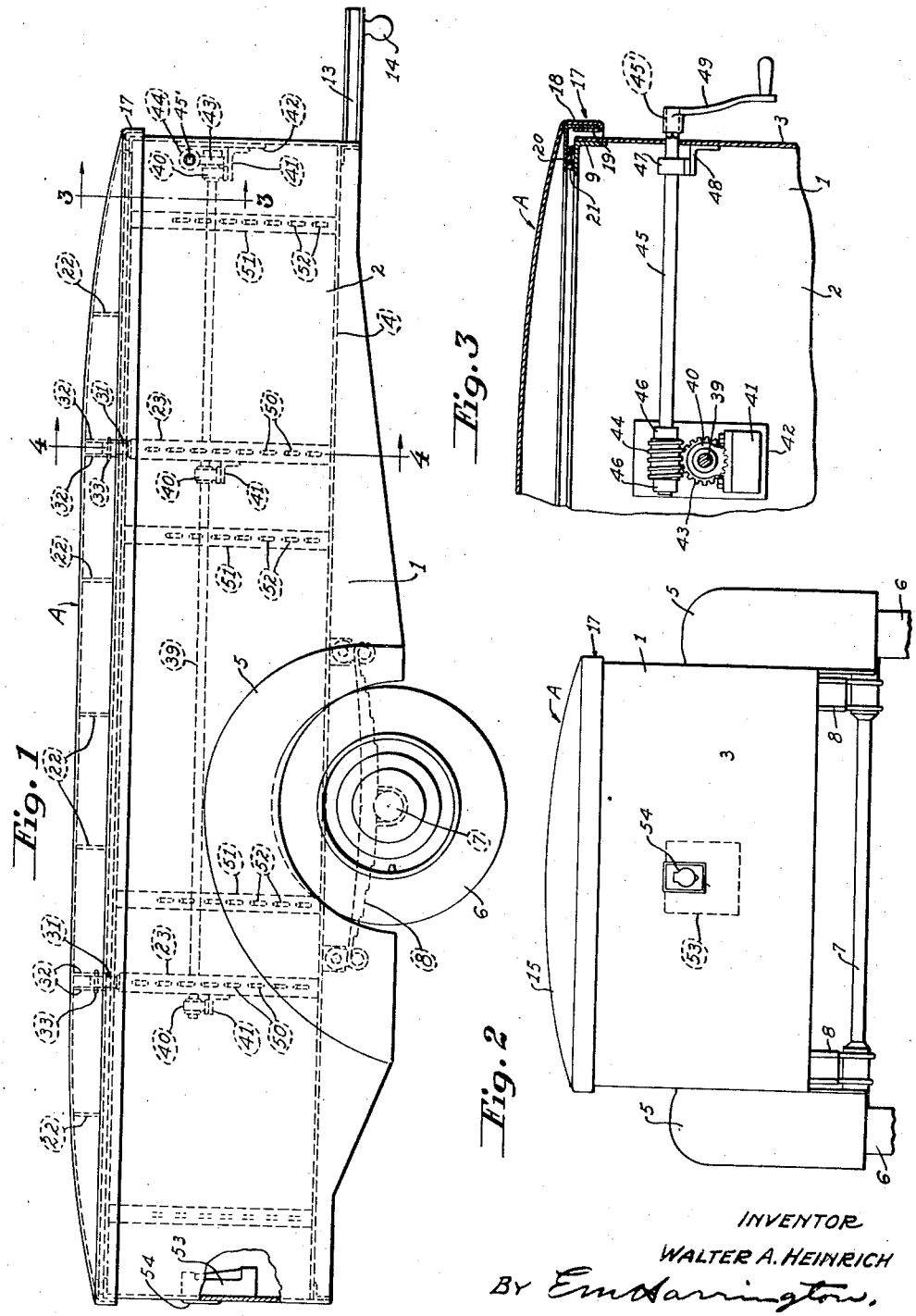
INVENTOR
WALTER A. HEINRICH
BY Em Harrington,
ATTORNEY March 21, 1944.  W. A. HEINRICH  2,344,551
TRAILER
Filed March 7, 1941  2 Sheets-Sheet 2

INVENTOR
WALTER A. HEINRICH
BY
ATTORNEY

Patented Mar. 21, 1944

2,344,551

UNITED STATES PATENT OFFICE 2,344,551

TRAILER

Walter A. Heinrich, Richmond Heights, Mo., assignor to James R. Kearney Corporation, St. Louis, Mo., a corporation of Missouri Application March 7, 1941, Serial No. 382,135

3 Claims. (Cl. 296—100)

This invention relates generally to trailers adapted for attachment to motor and other vehicles and more specifically to trailers of the type employed for the transportation of tools and various other articles, the predominant object of the invention being to provide a trailer of the type mentioned which is of such unique construction and arrangement that it is capable of performing its intended function in an improved manner and with increased efficiency.

In the electrical equipment industry linemen and other workmen in the field usually travel about in motor vehicles in performing their duties and frequently the tools of these workers, and other articles and parts which they use, are transported in trailers attached to the motor vehicles. Among the tools employed by the electrical workers referred to that are transported in trailers are long clamp sticks which are employed to attach and detach clamps to and from overhead electrical conductors, and other tools that are mounted on long insulating poles and are used for various types of overhead work. Because of the length of the particular tools mentioned specifically above trailers used by electrical workers are of substantial length and also the cover, lid, or closure of the trailer which gives access to the interior of the trailer, must be so constructed and arranged that the long tools may be readily removed from the trailer or introduced thereinto.

Prior to this invention trailers of the type used by electrical workers in the field were provided with closures that were hinged to the body portions of the trailers and provided the top walls of the trailer body portions. However, this arrangement has been found to be faulty because of the fact that the hinges of the closures quickly became corroded due to exposure of the trailers to rain, snow, and dampness, and also, because of the difficulty of providing moisture-proof hinges, the tools within the trailers could not be maintained in the dry condition that is required to protect users of the tools from injury resulting from electrical shock.

In order to obviate the difficulties formerly encountered in the use of trailers of the types heretofore employed by electrical workers in the field, the trailer of the present invention was produced. This trailer includes a closure which serves as the top wall of the body portion of the trailer, but the closure of the present invention is not hinged to the body portion of the trailer, said closure instead having associated therewith operating mechanism adapted to move same bodily to its open position and to draw said closure to a closed position where it effectively seals the body portion of the trailer against entrance thereinto of moisture and dampness.

Fig. 1 is a side elevation of the improved trailer with a portion of the side wall broken away.

Fig. 2 is an end elevation of the trailer illustrated in Fig. 1, the lower portions of the wheels of the trailer being broken away.

Fig. 3 is an enlarged fragmentary section taken on line 3—3 of Fig. 1.

Figure 4:
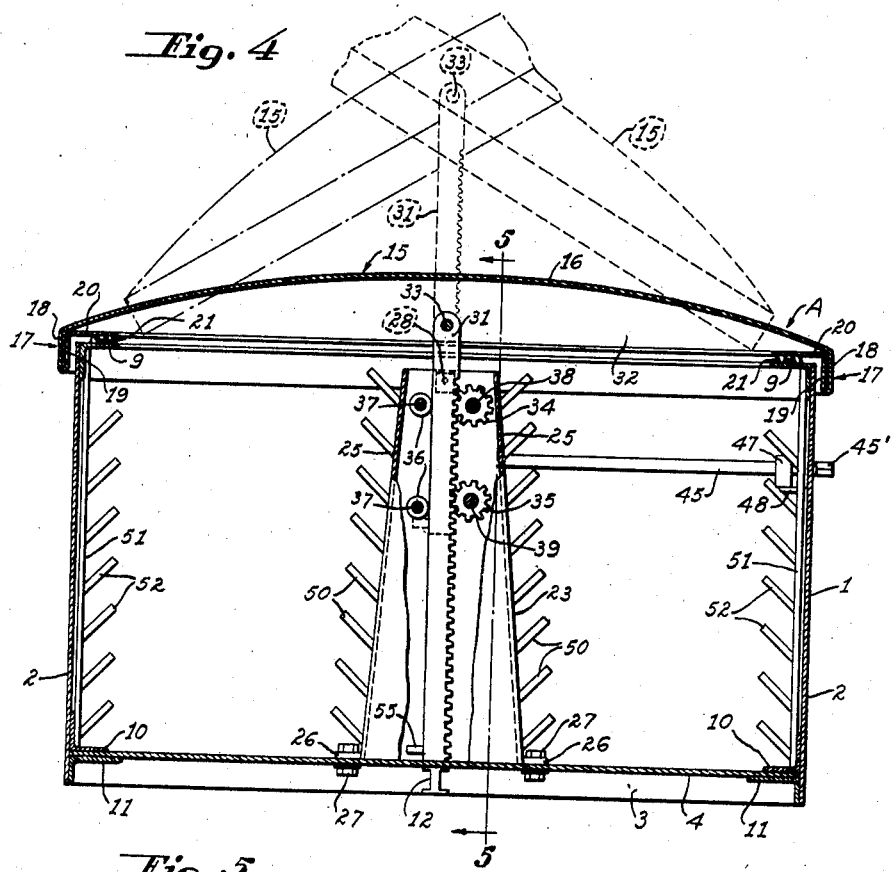
Fig. 4 is an enlarged cross-section taken on line 4—4 of Fig. 1.

In the drawings, wherein is shown for the purpose of illustration, merely, one embodiment of the invention, A designates the improved trailer generally. The trailer A comprises a body portion 1 which preferably, though not necessarily, is made from sheet metal, said body portion comprising opposed side walls 2, opposed end walls 3, and a bottom wall 4. The opposed side walls 2 have associated therewith suitable fenders 5 which embrace the upper portions of a pair of suitable, opposed ground wheels 6, the shaft 7 by which said ground wheels are supported being attached to the body portion of the trailer A by suitable spring and shackle assemblies designated generally by the reference character 8. At the upper portion of the body portion of the trailer A angle bar sections 9 are secured in place so as to connect and brace the side and end walls of said body portion, said angle bar sections being disposed so that vertical legs thereof are in contact with the side and end walls of the body portion and horizontal legs extend inwardly with respect to said side and end walls. Likewise the bottom wall 4 is secured in place and is supported by angle bar sections 10 and 11 and a longitudinally extended I beam 12, as is shown clearly in Fig. 4, said angle bar sections being suitably secured to said side and end walls and to said bottom wall, and said I beam being secured at its opposite ends to the angle bar sections 11 located at opposite ends of the body portion of the trailer. Also the body portion of the trailer A has fixed thereto and extended forwardly thereof a bar 13 which has mounted at its outer end an element 14 which constitutes a part of a suitable coupling means for attaching the trailer to a vehicle by which it is to be drawn.

The trailer A is provided with a closure 15 for the upper, open portion of the body portion 1. This closure comprises an arcuate top wall 16 which is curved transversely of the closure as shown to the best advantage in Fig. 4, said top wall also being curved downwardly at its opposite ends, longitudinally of the closure, as shown in Fig. 1. At its opposite sides and opposite ends the closure 15 is provided with a downwardly extended, marginal flange 17 which embraces the upper portion of the body portion of the trailer when the closure is in the closed position as shown to the best advantage in Fig. 4. The marginal flange is produced by downwardly projected extension portions 18 of the top wall 16 of the closure which are bent inwardly upon themselves and turned upwardly to provide portions 19 which are disposed parallel relative to the portions 18 in slight inwardly spaced relation with respect thereto. Associated with the closure 15 is an angular structure 20 which includes a vertical leg which is interposed and secured between the portions 18 and 19 of the marginal flange 17, and a horizontal leg, which when the closure 15 is in its closed position, overhangs the horizontal legs of the angular bar sections 9, said angle bar sections having mounted thereon a continuous gasket 21 which serves to provide a fluid-tight joint between said horizontal legs of said angle bar sections and the horizontal leg of the angle structure 20 when the closure 15 is in the closed position. Also the closure 15 is provided with transversely extended, vertically disposed bracing members 22 which are spaced longitudinally of said closure as shown in Fig. 1.

Figure 5:
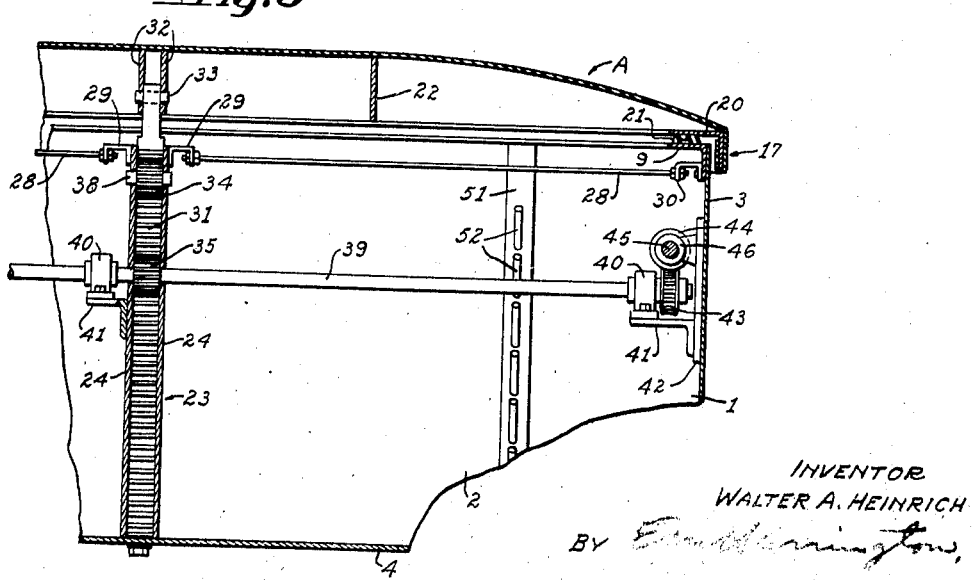
Fig. 5 is an enlarged fragmentary longitudinal section of the improved trailer taken on line 5—5 of Fig. 4.

Disposed within the body portion of the trailer A in longitudinally spaced relation is a pair of guiding structures 23. Each of the guiding structures 23 comprises a pair of substantially parallel side walls 24 which are spaced apart as shown in Fig. 5 and are shaped as shown in Fig. 4; that is to say each side wall 24 is of tapered shape, being relatively narrow at the top and tapering to a greater width at the bottom. Also, each guiding structure 23 includes end walls 25 which are secured to the side walls so as to close the structure at its opposite ends and are provided with horizontal extensions 26 at their lower ends that rest upon the bottom wall of the body portion of the trailer and are secured thereto by bolts 27. The guiding structures 23 are open at their upper ends, as shown in Fig. 4, and said guiding structures are braced at their upper ends by tie rods 28 which are fixed to members 29 secured to the guiding structures and to similar members 30 secured to the angle bar sections 9 located at opposite ends of the body portion of the trailer.

Located within the pair of guiding structures 23 for guided, vertical movement relative thereto is a pair of racks 31, opposite side faces of said racks being disposed in sliding contact with the inner faces of the side walls of the guiding structures. The teeth of the racks 31 extend from the lower ends of said racks to a point short of the upper ends of the racks, and the upper end portions of each of said racks is disposed between a pair of members 32 forming parts of the closure structure and shaped in accordance with the bracing members 22, said upper portion of each of said racks being pivotally attached to the associated members 32 by a pivot element 33 which is supported by the upper portion of the rack and extends through openings formed through the spaced members 32. Each rack is guided for vertical movement by a pair of pinions 34 and 35 which mesh with the teeth of the rack, and a pair of rollers 36 that are mounted on rods 37 supported by the side walls of the guiding structure 23 and are arranged in rolling contact with the face of the rack opposed to the face thereof at which the teeth are located. The pinion 34 is an idler, merely, being mounted on a shaft 38 supported by the opposed side walls of the associated guiding structure 23, while the pinion 35 is a driving pinion which, when rotated, serves to move the associated rack vertically.

The two pinions 35, associated with the pair of racks 31 located within the pair of guiding structures 23, are fixedly mounted on a shaft 39 which is extended longitudinally of the body portion of the trailer A, said shaft 39 being supported for rotation by bearings 40 which are supported by brackets 41 secured to the guiding structures 23 and to a plate 42 fixedly associated with the forward end wall of the body portion of the trailer. The shaft 39 at its forward end has fixedly mounted thereon a worm wheel 43, said worm wheel having a worm 44 arranged in mesh therewith. The worm 44 is fixedly mounted on a shaft 45 which is supported for rotation by bearings 46 supported by the plate 42 and a bearing 47 supported by a bracket 48 fixed to a side wall of the body portion of the trailer, said shaft 45 being extended through an opening formed through said side wall of the trailer body portion and having a non-circular outer end portion 45' adapted to detachably receive an operating crank 49.

The end walls 25 of the guiding structures 23 support upwardly inclined pegs 50, and secured at the side walls of the body portion of the trailer are longitudinally spaced, vertically disposed bars 51 which support similar upwardly inclined pegs 52. The pegs 50 and 52 serve to support clamp sticks and other tools within the trailer. Also the rear end wall of the body portion of the trailer supports an electric heater 53 which may be placed in operation to heat the interior of the trailer so as to dry out tools which have become damp during use thereof. The heater 53 may have associated therewith a suitable electrical socket 54, supported by the rear end wall of the body portion of the trailer, into which an electrical lead may be plugged when the trailer is in a garage, for instance, where a source of electrical energy is present.

When, in the use of the improved trailer, it is desired to raise the closure 15 from the closed to the open position, the crank 49 is applied to the non-circular, extended end portion 45' of the shaft 45, and said crank is rotated to subject the shaft 45 to rotation in the appropriate direction. Such rotation of the shaft 45 will be transmitted through the worm and worm wheel 44 and 43 to the shaft 39 with the result that the racks 31 will be moved upwardly by the rotating pinions 35 until the pins 55 extended from the lower end portions of the racks contact with the lowermost rollers 36, as shown by dotted lines in Fig. 4, to arrest such upward movement of the racks. The closure 15 will move upwardly with the racks to an elevated position and the operator may cause said closure to assume the position in which it is shown by dotted lines in Fig. 4, or the position in which said closure is shown by dot and dash lines in said view, by merely moving said closure with his hand about the pivots 33, so as to give access to one or the opposite side of the body portion of the trailer. Likewise, when it is desired to lower the closure from the open to the closed position the direction of rotation of the shaft 45 is reversed to cause the racks 31 to be moved downwardly whereupon the closure will be moved to the closed position shown by full lines in Fig. 4 where the gasket 21 provides a fluid-tight joint between the closure 15 and the body portion 1 of the trailer.

I claim:

1. A vehicle comprising a body portion which provides a receptacle for articles to be transported and which is open at its top, a closure for the open top of said body portion, said closure being adapted for vertical movement with respect to said body portion, and means for subjecting said closure to vertical movement relative to said body portion so as to dispose said closure in a lowered position where it closes the open top of said body portion or in an elevated position where access may be had to the interior of the body portion through the open top thereof, said movement-imparting means including a plurality of rack bars arranged within said body portion, means for guiding said rack bars for maintained straight-line vertical movement, pinions adapted for rotation in meshing engagement with the teeth of said rack bars for subjecting said rack bars to vertical movement, means operable from the exterior of said body portion for rotating said pinions and means for pivotally connecting the upper portions of said rack bars to said closure at the approximate transverse center of said closure whereby said closure may be moved pivotally about said pivot means when in an elevated position to dispose said closure in different positions relative to the top of the body portion where one or the opposite side of the closure is supported by the top of the body portion and the closure extends upwardly at an angle relative to the top of the body portion from its side so supported.

2. A vehicle comprising a body portion which provides a receptacle for articles to be transported and which is open at its top, a closure for the open top of said body portion, said closure being adapted for vertical movement with respect to said body portion, and means for subjecting said closure to vertical movement relative to said body portion so as to dispose said closure in a lowered position where it closes the open top of said body portion or in an elevated position where access may be had to the interior of the body portion through the open top thereof, said movement-imparting means including a plurality of rack bars spaced longitudinally of said body portion within same, means for guiding said rack bars for maintained straight-line vertical movement, pinions adapted for rotation in meshing engagement with the teeth of said rack bars for subjecting said rack bars to vertical movement, a rotatably supported shaft on which said pinions are fixedly mounted, means operable from the exterior of said body portion for rotating said shaft and pinions, and means for pivotally connecting the upper portions of said rack bars to said closure at the approximate transverse center of said closure whereby said closure may be moved pivotally about said pivot means when in an elevated position to dispose said closure in different positions relative to the top of the body portion where one or the opposite side of the closure is supported by the top of the body portion and the closure extends upwardly at an angle relative to the top of the body portion from its side so supported.

3. A vehicle comprising a body portion which provides a receptacle for articles to be transported and which is open at its top, a closure for the open top of said body portion, said closure being adapted for vertical movement with respect to said body portion, and means for subjecting said closure to vertical movement relative to said body portion so as to dispose said closure in a lowered position where it closes the open top of said body portion or in an elevated position where access may be had to the interior of the body portion through the open top thereof, said movement-imparting means including a plurality of rack bars spaced longitudinally of said body portion within same, means for guiding said rack bars for maintained straight-line vertical movement, pinions adapted for rotation in meshing engagement with the teeth of said rack bars for subjecting said rack bars to vertical movement, a rotatably supported shaft on which said pinions are fixedly mounted, means for rotating said pinions from the exterior of the body portion, said means comprising a rotatably supported shaft having an end portion extended through a wall of said body portion, and gearing for transmitting rotary motion from said shaft to the shaft on which the pinions are mounted, and means for pivotally connecting the upper portions of said rack bars to said closure at the approximate transverse center of said closure whereby said closure may be moved pivotally about said pivot means when in an elevated position to dispose said closure in different positions relative to the top of the body portion where one or the opposite side of the closure is supported by the top of the body portion and the closure extends upwardly at an angle relative to the top of the body portion from its side so supported.

WALTER A. HEINRICH.